A. TURNBULL.
Spring-Scales.
No. 5,901. Reissued June 2, 1874.
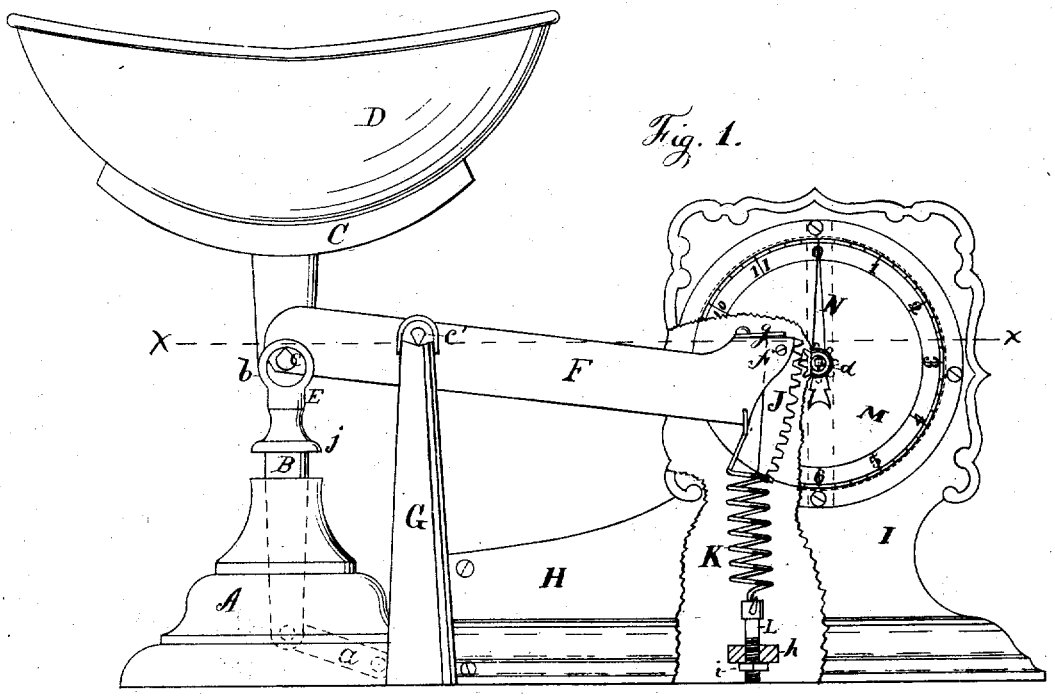
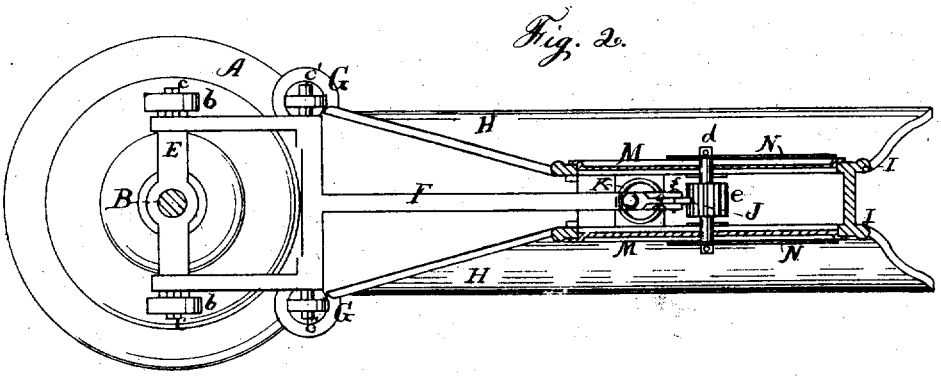
Witnesses.
H. M. Beadle
Harry C. Clark.
Inventor.
Andrew Turnbull.
By James Shepard atty.

UNITED STATES PATENT OFFICE.

ANDREW TURNBULL, OF NEW BRITAIN, CONNECTICUT, ASSIGNOR, BY MESNE ASSIGNMENTS, TO LANDERS, FRARY, AND CLARK, OF SAME PLACE.

IMPROVEMENT IN SPRING-SCALES.

Specification forming part of Letters Patent No. 25,473, dated September 13, 1859; extended seven years; reissue No. 5,901, dated June 2, 1874; application filed February 11, 1874.

*To all whom it may concern:*

Be it known that I, ANDREW TURNBULL, of New Britain, in the county of Hartford and State of Connecticut, have invented a new and Improved Weighing Device, the same being a combination of what are generally known as the spring-balance and the counter-scales; and I do hereby declare that the following is a full, clear, and exact description of the same, reference being had to the annexed drawings, making a part of this specification, in which—

Figure 1 is a side view of my invention, a portion of the casing being removed in order to exhibit the internal mechanism; Fig. 2, a horizontal section of the same, taken in the line *x x*, Fig. 1.

Similar letters of reference indicate corresponding parts in the two figures.

The object of this invention is to obtain a weighing device by which articles may be weighed accurately and with facility, the adjustment of poise-weights dispensed with, and, at the same time, one that will admit of being used on a counter, as the ordinary counter-scales. The invention consists in combining a spring-balance with the scoop-platform, by means substantially as hereinafter described, whereby the desired end is attained.

To enable those skilled in the art to fully understand and construct my invention, I will proceed to describe it.

A represents a hollow conical base, through the upper end or apex of which an arbor, B, passes, the lower end of said arbor being connected to the interior of the base by a link, *a*. On the upper end of the arbor B a scoop platform or frame, C, is placed to receive a scoop, D, of the usual or any proper form; and near the upper end of the arbor there is a cross-bar, E, which is provided at each end with an eye, *b*. These eyes *b b* are fitted on bearings *c c* at the outer end of the lever F, the outer end of said lever being divaricated, as shown clearly in Fig. 2, so as to extend around the arbor B to opposite sides at points adjoining the eyes *b*. The fulcrum of the lever F is formed by having two projections, *c′ c′*—one at each side of the inner extremity of the divaricated portion of the lever. These projections are fitted in bearings at the upper end of uprights G G, attached to the base A. The base and uprights may be of cast metal, and cast in one piece. The scoop platform or frame C may also be of cast metal, and also the lever F. The arbor B is allowed to rise and fall freely in the base A, the link *a* serving as a guide, as usual. To the lower parts of the uprights G G plates H H are attached—one to each. These plates project out from the uprights G, and each has an upright shell, I, at its outer end. These shells are connected together by screws or bolts, and form a box or case into which the inner end of the lever F passes, and is allowed to work freely up and down therein. Within the case formed by the shells I I an arbor, *d*, is placed transversely, and has a pinion, *e*, fitted on it. Into this pinion a rack, J, gears, said rack being attached to the inner ends of the lever F by a pivot, *f*, on which the rack J is suspended loosely, the rack being kept in gear with the pinion by a spring, *g*, attached to the upper edge of the lever F. To the inner end of the lever F one end of a spiral spring, K, is attached. The opposite end of this spring is attached to a screw, L, which passes through a transverse bar, *h*, in the lower part of the case formed by the shells I I, the end of the screw having a nut, *i*, on it, as shown clearly in Fig. 1. To the outer side of each shell I a graduated circular plate, M, is attached, and on each end of the arbor *d* an index, N, is secured, said arbor passing through the centers of the plates M. The indexes N point out on the plate M the degree of tension to which the spring K is subjected when the outer end of the lever F is depressed by the article to be weighed, and, consequently, the weight of the article in the scoop is indicated by the indexes. It will, of course, be seen that the indexes are actuated by the rack J and pinion *e*. One plate, M, is necessarily graduated in a reverse manner or order to the other, so that they may conform to the direction of the movement of the indexes. On the arbor B there is a projecting hub or boss, *j*, which serves as a stop, preventing any unnecessary depression of the arbor and undue tension of spring K. By the employment or use of two indexes and graduated plates, M M—one at each side—the device will not require to be turned around in any case, as the weight will be indicated at both sides. By having one end of the spring K attached by the screw L and nut *i* to the transverse bar *h*, the spring K, in case of becoming weak, may be strained by screwing up the nut *i*, and kept at a uniform tension. By having the rack J attached by a pivot kept in gear with the pinion *e*, by a spring, *g*, compensation is made for wear and any irregularity or inaccuracy in the rack or pinion, and the device will operate much more correctly than if the rack were rigidly attached.

The arbor B, with scoop-platform C attached, and guide-link *a*, together with the lever F, are old and well-known devices, and I do not claim said parts; but I do claim as my invention—

1. The combination of the scoop-platform C, the arbor B, and lever F with the spring K, rack J, pinion *e*, and index or indexes N attached to its arbor *d*, and traversing over a graduated plate or plates, substantially as and for the purpose set forth.

2. The combination of the rack J, spring *g*, and pinion *e*, substantially as and for the purpose set forth.

3. The combination of the transverse bar *h*, nut *i*, screw L, spring K, and movable arm F, substantially as and for the purpose set forth.

4. In combination with the beam-lever F, spring K, and indexes N, connected with the lever, the stop *j* on the arbor B, as and for the purposes specified.

ANDREW TURNBULL.

Witnesses:

J. C. ATWOOD,

S. B. HARPER.